United States Patent [19]

Jordan

[11] Patent Number: 5,515,686
[45] Date of Patent: May 14, 1996

[54] ABSORBER FLUID CIRCUIT FOR VAPOR RECOVERY SYSTEM

[75] Inventor: Mark A. Jordan, Louisville, Ky.

[73] Assignee: Jordan Holding Company, Louisville, Ky.

[21] Appl. No.: 380,483

[22] Filed: Jan. 30, 1995

[51] Int. Cl.$^6$ ............... B01D 53/047; B01D 185/10; F25J 3/00
[52] U.S. Cl. .............. 96/126; 62/48.2; 62/636; 95/94; 95/187; 96/136
[58] Field of Search ............... 62/11, 18, 48.2; 95/92–98

[56] References Cited

U.S. PATENT DOCUMENTS

| | | | |
|---|---|---|---|
| 4,331,456 | 5/1982 | Schwartz et al. | 95/93 |
| 4,462,811 | 7/1984 | Dinsmore et al. | 95/26 |
| 4,670,028 | 6/1987 | Kennedy | 95/92 |
| 4,715,868 | 12/1987 | Kennedy | 95/94 |
| 4,857,084 | 8/1989 | Robbins et al. | 95/97 |
| 5,017,240 | 5/1991 | Brown | 62/48.2 X |
| 5,076,822 | 12/1991 | Hewitt | 62/48.2 X |
| 5,125,935 | 6/1992 | Nakaya et al. | 95/98 |
| 5,154,735 | 10/1992 | Dinsmore et al. | 95/92 |
| 5,269,833 | 12/1993 | Nitsche | 95/93 |
| 5,294,246 | 3/1994 | Gardner, Sr. | 95/15 |
| 5,345,771 | 9/1994 | Dinsmore | 62/18 |
| 5,426,945 | 6/1995 | Menzenski | 62/11 |

FOREIGN PATENT DOCUMENTS 0628336A  12/1994  European Pat. Off. .

OTHER PUBLICATIONS

Agippetroli S.P.A./Kappa Gi; Product Brochure; date unknown.

*Primary Examiner*—Christopher Kilner
*Attorney, Agent, or Firm*—King and Schickli

[57] ABSTRACT

An absorber fluid circuit is provided for a volatile liquid vapor recovery system. The vapor recovery system includes at least one adsorbent bed for capturing volatile liquid vapor, a vacuum pump for regenerating the adsorbent bed, a heat exchanger for cooling the vacuum pump, an absorber tower for condensing volatile liquid vapor and an absorber fluid source. The absorber fluid circuit includes an absorber fluid supply pump and a first conduit for directing absorber fluid from the absorber fluid source to the supply pump. A second conduit directs absorber fluid from the supply pump to both the heat exchanger and absorber tower. A third conduit returns spent absorber fluid from the heat exchanger and absorber tower back to the absorber fluid source.

4 Claims, 1 Drawing Sheet

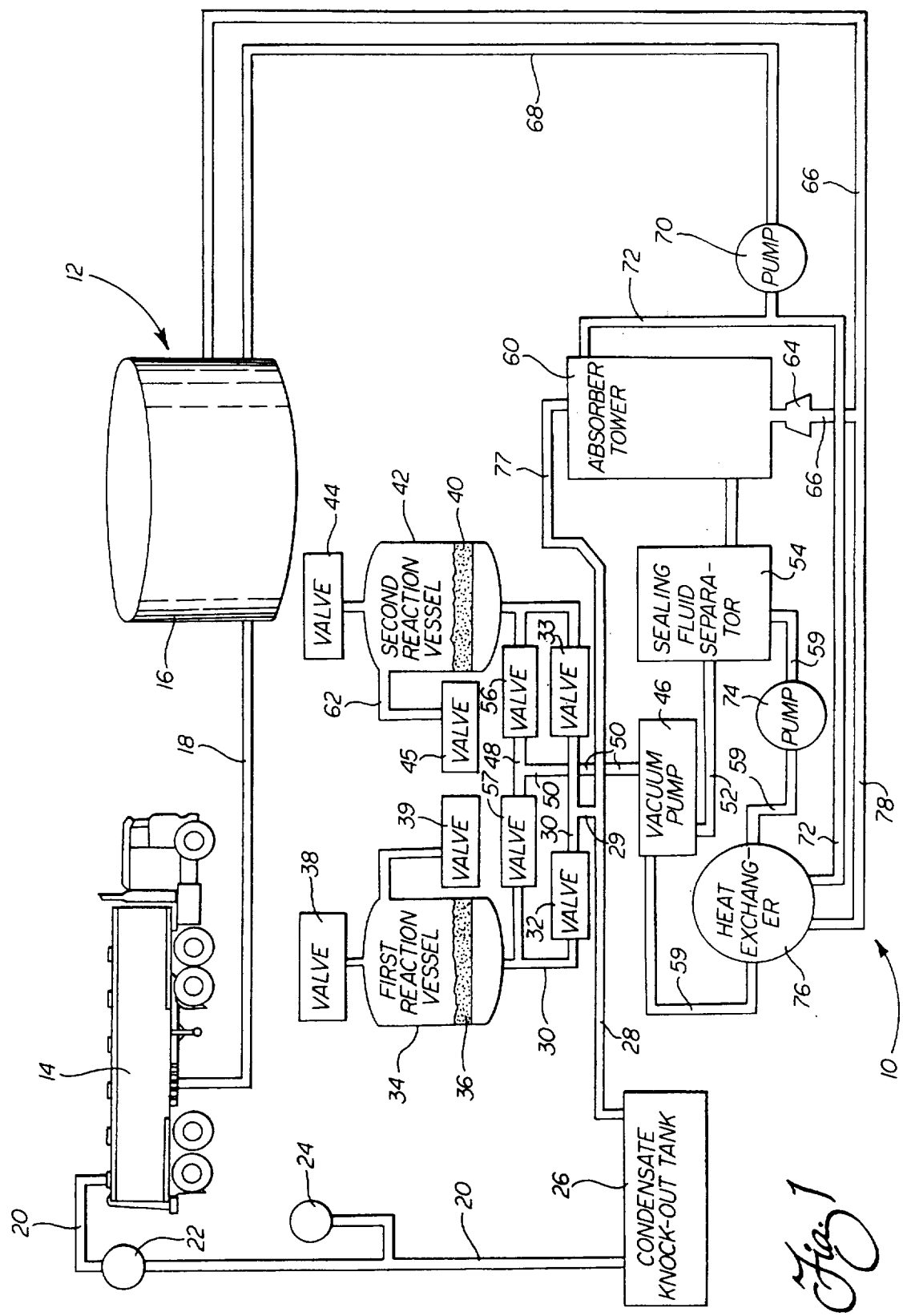

5,515,686

ABSORBER FLUID CIRCUIT FOR VAPOR RECOVERY SYSTEM

TECHNICAL FIELD

The present invention relates generally to the field of volatile liquid vapor recovery and, more particularly, to an apparatus and a method for improving the efficiency of a combined adsorption/absorption tower vapor recovery system.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the recovered volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. Patents including, for example, U.S. Pat. No. 4,276,058 to Dinsmore, the disclosure of which is fully incorporated herein by reference. Such systems utilize a bed of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated that the bed of adsorbent used in these systems is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed that removes the largest amount of hydrocarbons. The second step is the addition of a purge air stream that passes through the bed. The purge air polishes the bed so as to remove substantially all of the previously adsorbed hydrocarbons. These hydrocarbons are then pumped to an absorber tower wherein lean oil or other nonvolatile liquid solvent is provided in a countercurrent flow relative to the hydrocarbon rich air-hydrocarbon mixture being pumped from the bed. The liquid solvent condenses and removes the vast majority of the hydrocarbons from that mixture and the residue gas stream from the absorber tower is recycled to a second bed of adsorbent while the first bed completes regeneration.

For best efficiency of operation, it should be appreciated that the adsorbent bed must be quickly regenerated to restore the ability of the bed to adsorb volatile liquid vapors. This can best be accomplished by maximizing the performance of the vacuum pump. This may be achieved by operating the vacuum pump at cooler temperatures. Further, the absorber fluid, e.g. lean oil or other nonvolatile liquid solvent, must provide as rapid and complete a recovery of volatile liquid vapor by condensation as possible. This may be achieved by delivering absorber fluid at cooler temperatures to the absorber tower.

Prior art vapor recovery systems do not provide any effective means for optimizing the use of the available "cooling potential" of the absorber fluid or lean oil in the storage tank to achieve these important ends. For example, in the Dinsmore patent absorber fluid or lean oil from the storage tank is directly introduced into both the absorber tower and heat exchanger. The "spent" absorber fluid is, however, then returned from the heat exchanger to the absorber tower. Thus, the heat transferred to the absorber fluid by the heat exchanger is reintroduced into the air-hydrocarbon vapor mixture being processed in the system at the absorber tower. The resulting increase in temperature in the absorber tower impedes efficient condensation and, therefore, liquid vapor recovery. Accordingly, more vapor remains in the air stream exhausted from the absorber tower. This vapor requires subsequent recovery in the second adsorbent bed. Bed capacity is, of course, used in the recovery of this vapor. It should therefore be appreciated that the prior art approach as disclosed in Dinsmore for the circulation of absorber fluid causes a dual negative impact: that is, a reduction in both absorber tower and adsorbent bed vapor recovery efficiency.

It has also been proposed in the prior art to route the absorber fluid from the storage tank direct to the absorber tower. The spent absorber fluid is then directed from the absorber tower through the heat exchanger before returning to the storage tank. As the absorber fluid passes through the absorber tower it contacts vapor delivered from the vacuum pump at temperatures up to 120° F. Hence, the absorber fluid from the absorber tower has absorbed a significant amount of heat and, therefore, cannot provide effective cooling of the vacuum pump. Accordingly, the vacuum pump runs hotter at reduced efficiency. As a result, more time is required to regenerate the bed to the desired level. System productivity is, therefore, impaired and greater energy is used in running the vacuum pump over the longer operating cycle required to complete regeneration.

A need is, therefore, identified for a new and improved approach for enhancing the efficiency of a combined adsorption/absorption vapor recovery system.

SUMMARY OF THE INVENTION

Accordingly, it is a primary object of the present invention to provide an improved apparatus and method for the recovery of volatile liquids from an air-volatile liquid vapor mixture overcoming the above-described limitations and disadvantages of the prior art. Specifically, the apparatus and method utilize the latent cooling potential of the volatile liquid vapor in the storage tank to maximize vapor recovery system efficiency.

Another object of the present invention is to provide an apparatus for the recovery of volatile liquids from an air-volatile liquid vapor mixture wherein significant increases in removal efficiency are provided. Advantageously, this is accomplished without increasing the size of the adsorbent beds and without any substantial increases in the capital cost of the equipment.

Still another object of the present invention is to provide an absorber fluid circuit for a volatile liquid vapor recovery system incorporating at least one adsorbent bed, a vacuum pump for regenerating the bed, a heat exchanger for cooling the vacuum pump, an absorber tower for condensing volatile liquid vapor and an absorber fluid source. The absorber fluid circuit circulates relatively cool absorber fluid (e.g. volatile hydrocarbons) from a source such as a storage tank direct to the heat exchanger to cool the vacuum pump and the absorber tower to condense volatile liquid vapors. The spend absorber fluid from the heat exchanger and absorber tower is then returned to the storage tank. In this way the absorber fluid is used at it maximum potential to draw heat from the vapor recovery system. The vacuum pump benefits by better cooling and therefore operates at peak efficiency. The absorber fluid delivered to the absorber tower is cooler and, therefore, better promotes vapor recovery via condensation. Accordingly, system efficiency is significantly enhanced.

Yet another object of the invention is to provide an absorber fluid circuit that incorporates a venturi tube to recover and return absorber fluid from the absorber tower to the absorber fluid source or storage tank. This effectively eliminates the need for providing a return pump as used in prior art designs. Accordingly, system costs and operating expenses are significantly reduced.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved absorber fluid circuit is provided for a volatile liquid vapor recovery system including at least one adsorbent bed, a vacuum pump for regenerating the bed, a heat exchanger for cooling the vacuum pump, an absorber tower for condensing the volatile liquid vapor and an absorber fluid source. The absorber fluid circuit includes an absorber fluid supply pump having an inlet and an outlet. A first conduit connects the inlet of the supply pump to the absorber fluid source or storage tank. A second conduit connects the outlet of the supply pump to both the heat exchanger and absorber tower. Accordingly, while valving may be provided for exact adjustability, approximately one half of the absorber fluid from the supply pump is delivered to the heat exchanger and one half is delivered to the absorber tower.

The absorber fluid delivered to the heat exchanger serves to cool the vacuum pump sealing fluid thereby allowing the vacuum pump to operate at lower temperatures. This insures higher vacuum pump efficiency and, therefore, quicker and more complete regeneration of the adsorbent bed. The absorber fluid delivered to the absorber tower cools and condenses the volatile liquid vapor drawn from the adsorbent bed by the vacuum pump. Advantageously, since no previously heated absorber fluid is delivered to the absorber tower, a greater amount or level of liquid vapor is condensed for recovery. Accordingly, less liquid vapor remains in the outlet air stream for delivery to a second absorbent bed where that air stream is cleaned for exhausting into the environment. Advantageously, this serves to preserve the capacity of the second bed thereby further improving the efficiency of the vapor recovery system. A third conduit is provided to return the spent absorber fluid from both the heat exchanger and the absorber tower directly to the absorber fluid source where it is stored.

In accordance with a further aspect of the present invention, a venturi tube may be utilized to draw absorber fluid from the absorber tower into the third conduit for delivery to the source or storage tank. In this way it is possible to eliminate the need for a mechanical pump or other electrical powered mechanical pumping device commonly utilized in the prior art for this purpose. As a result, original capital costs as well as system maintenance and operating costs are all significantly reduced.

In accordance with still another aspect of the present invention, a volatile liquid vapor recovery system is provided and claimed incorporating the absorber fluid circuit just described. Further, a process for cooling a heat exchanger and condensing a volatile liquid vapor in an absorber tower of an adsorption/absorption volatile liquid vapor recovery system is provided. The process includes the step of delivering absorber fluid from an absorber fluid source to both the heat exchanger and the absorber tower. Next is the returning of the spent absorber fluid from the heat exchanger to the absorber fluid source while bypassing the absorber tower. Additionally, the process includes the step of recovering and returning spent absorber fluid and recovered vapor from the absorber tower to the absorber fluid source while bypassing the heat exchanger. Advantageously, as described above, by directly delivering absorber fluid from the absorber fluid storage tank direct to the heat exchanger and absorber tower and directly returning them in the opposite manner, it is possible to gain the maximum benefit derivable from the "cooling potential" of the absorber fluid.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a schematical diagram showing a volatile liquid recovery system incorporating the improved absorber fluid circuit of the present invention.

Reference will now be made in detail to the present preferred embodiment of the invention, an example of which is illustrated in the accompanying drawing.

DETAILED DESCRIPTION OF THE INVENTION

Reference is now made to FIG. 1 showing the absorber fluid circuit 10 of the present invention incorporated into a liquid vapor recovery system, generally designated by reference numeral 12. As will become apparent as the description hereof proceeds, the absorber fluid circuit 10 functions to significantly enhance the operating efficiency and productivity of the adsorption/absorption vapor recovery system 12 by both reducing the operating cost and increasing system efficiency and throughput. The vapor recovery system 12 is generally of the type disclosed and described in U.S. Pat. No. 4,066,423 to McGill et al. the disclosure of which is fully incorporated herein by reference.

As shown the vapor recovery system 12 is particularly suited to the recovery of vaporized hydrocarbons of the type expelled from trucks, tank cars and other vessels 14 as they are loaded with hydrocarbons from a storage tank 16 through a feed line 18. More particularly, those vapors are collected as an air-hydrocarbon vapor mixture in a collection line 20, attached to the truck 14 and delivered past a vapor check valve 22 and pressure/vacuum vent 24 to a condensate knock-out tank 26. From there, the air-hydrocarbon vapor mixture passes along the lines 28, 29 and 30 past open valve 32 (valve 33 is closed) to the first reaction vessel 34 including a first bed of absorbent 36. The bed 36 adsorbs the volatile hydrocarbon vapors and clean air is exhausted past the valve 38 into the environment, valve 39 being closed.

Simultaneously, the adsorbent bed 40 in the second reaction vessel 42 is being regenerated: that is, the capacity of the bed 42 to adsorb vapor is being renewed. To achieve this end, valves 44 and 45 are initially closed and the vacuum pump 46 is operated to pull a vacuum on the bed 40 in the second reaction vessel 42. Generally, as is known in the art, a liquid ring, two-stage vacuum pump having a capacity of 100–2000 csm is utilized for this purpose. Such a pump may, for example, be obtained from Graham Vacuum Pump of Batavia, N.Y. (e.g. Model 2V7240).

As the pump 46 draws the vacuum down in the reaction vessel 42 to 22–28 inches of mercury vacuum, a mixture of air and volatile liquid vapor is pulled from the bed 40. This mixture is directed by the pump 46 through conduits 48, 50, 52 into the sealing fluid separator 54 by operation of the valve 56 (open) and the valve 57 (closed). The sealing fluid separator 54 separates the pump sealing fluid, required for proper operation of the liquid ring, two-stage vacuum pump, from both the condensed volatile liquids that are recovered and the air-vapor mixture that is directed through conduit 58 to the absorber tower 60. As will be described in greater detail below, the sealing fluid recovered from the separator 54 is recirculated through the lines 59 to the pump 46.

Toward the end of the regeneration cycle, (e.g. when a specific vacuum level is reached or for a specific time such as the last one to two minutes of an approximately 10–17 minute cycle), a small quantity of purge air is introduced into the reaction vessel 42 by opening valve 45. This purge air is drawn from the ambient atmosphere through line 62 and is passed through the bed 40 to polish the absorbent clean of the remaining hydrocarbons. During this process it should be appreciated that the purge air is only introduced into the bed 42 at a rate sufficient to substantially maintain a pressure of approximately 22–28 and more preferably 25–27 inches of mercury vacuum. The purge air and the last of the hydrocarbons is also directed by the pump 46 through the separator 54 and conduit 58 to the absorber tower 60.

As is known in the art, the absorber tower 60 provides a countercurrent flow of solvents such as lean oil by means of a dispersal sprayer (not shown). The lean oil serves to condense the volatile liquid vapors from the air-volatile liquid vapor mixture drawn from the reaction vessel 42 by the pump 46 as just described.

The condensed hydrocarbons and lean oil are preferably collected from the bottom of the absorber tower 60 by operation of a venturi tube 64 and then delivered via conduit 66 to the storage tank 16. Preferably, the venturi tube 64 is able to pump between 25–200 gallons per minute. The sizing of the venturi tube depends upon the head pressure in the gasoline storage tank 16 and the desired pump or flow rate. The venturi tube 64 may be of a size from 1–12 inches and may, for example, be obtained from Penberthy of Prophetstown, Ill. By using a venturi tube 64 instead of a mechanical pump of a type used in the prior art, it is possible to eliminate this mechanical device from the system 12 thereby reducing original equipment, maintenance and operating costs. It should be appreciated, however, that the well known mechanical pump may still be used in place of the venturi tube 64 if desired.

The residue air that exits from the absorber tower 60 is largely free of volatile liquid vapor. It, however, is preferably recirculated or recycled for introduction into the first reaction vessel 34 via the conduits 77 and 30. In this way, any residual volatile liquid vapor may be captured in the bed 36 to complete the cleaning of the air prior to exhausting into the environment past valve 38.

Of course, as is well known in the art it should be appreciated that the reaction vessels 34 and 42 are essentially identical and that the operation thereof may be reversed as required to provide for continuous processing. This means that when the bed 36 is saturated, the bed 36 may be regenerated in the manner described above with reference to the bed 42 while the bed 42 is simultaneously utilized to capture hydrocarbons in the manner described above with reference to the bed 36. This is accomplished by simply reversing the operation of the valve pairs 32 and 33, 56 and 57, 38 and 44, and 39 and 45, respectively to control the flow through the vapor recovery system 12.

In accordance with an important aspect of the present invention, the absorber fluid circuit 10 will now be reviewed in detail. As should be appreciated from viewing FIG. 1, lean oil is withdrawn from the storage tank 16 through a first conduit 68 connected to the inlet of the supply pump 70. Supply pump 70 should provide a pumping capacity of preferably between 50–400 gallons a minute and, therefore, may vary typically from 2–15 horsepower. The outlet of the supply pump 70 is connected to a second conduit 72 that directs the lean oil to both the absorber tower 60 and a heat exchanger 76 for cooling the sealing fluid of the vacuum pump 46. The lean oil flow is split approximately 50/50 between the heat exchanger 76 and the absorber tower 60. If desired, however, a flow control valve may, of course, be provided to adjust the flow to any desired ratio required for most efficient processing.

Preferably, the absorber tower 60 is a packed absorber tower such as available from John F. Jordan Service Company under the model designation B-1. The heat exchanger is preferably a tubing shell as manufactured, for example, by BASCO of Buffalo, N.Y.

As described above, during processing, sealing fluid is recovered from the air-volatile vapor mixture and condensates in the separator 54 (e.g. a PS-1 separator as manufactured by John F. Jordan Service Company, Inc.) and circulated by pump 74 at a rate of 5–100 gallons a minute through the lines 59 and the heat exchanger 76 back to the vacuum pump 46. In the heat exchanger 76, heat is transferred from the sealing fluid to the lean oil which is then returned through a third conduit 78, 66 back to the storage tank 16. As a result, the vacuum pump 46 operates at a cooler temperature and, therefore, a greater efficiency. Accordingly, bed regeneration is completed in a shorter period of time. Operating costs are therefore reduced while system efficiency and throughput are increased.

During processing, the absorber tower 60 also receives a continuous flow of "cool" lean oil to maximized the absorption efficiency in the absorber tower and thereby enhance the generation and recovery of volatile liquid vapor condensate. As a result, cleaner air is discharged to the second bed through conduits 77 and 30. Accordingly, system efficiency is again improved.

In summary, numerous benefits results from employing the concepts of the present invention. Advantageously, by providing lean oil directly from a storage tank to both the absorber tower 60 and heat exchanger 76, both the absorber tower and heat exchanger are operating at maximum efficiency. This is because the cooler ambient temperatures of the lean oil from the storage tank are used to their full advantage. Specifically, spent lean oil from the heat exchanger and absorber tower are returned directly to the storage tank and not routed from the heat exchanger to the absorber tower or from the absorber tower to the heat exchanger as in prior art systems. As a result, the present invention functions to remove heat from the vapor recovery system. This heat is then dissipated in the vast lean oil capacity of the storage tank. In contrast, in prior art systems, heat gathered in the heat exchanger is returned to the absorber tower or heat gathered in the absorber tower is returned to the heat exchanger. In either instance in the prior art, operating efficiency is adversely affected by the direct return of heat into the recovery system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. In a volatile liquid vapor recovery system including at least one adsorbent bed, a vacuum pump for regenerating the bed, a heat exchanger for cooling the vacuum pump, an absorber tower for condensing volatile liquid vapor and an absorber fluid source, the improvement comprising:

an absorber fluid circuit including;
  (a) an absorber fluid supply pump having an inlet and an outlet;
  (b) first conduit means for connecting said inlet of said supply pump to the absorber fluid source;
  (c) second conduit means for connecting said outlet of said supply pump to the heat exchanger and absorber tower; and
  (d) third conduit means for returning spent absorber fluid from the heat exchanger to the absorber fluid source while always bypassing the absorber tower and from the absorber tower to the absorber fluid source while always bypassing the heat exchanger.

2. The absorber fluid circuit set forth in claim 1 further including a venturi tube for drawing absorber fluid from the absorber tower into said third conduit means.

3. A volatile liquid vapor recovery system incorporating said absorber fluid circuit set forth in claim 1.

4. A process for cooling a heat exchanger and condensing a volatile liquid vapor in an absorber tower of a volatile liquid vapor recovery system, comprising:

delivering absorber fluid from an absorber fluid source to both the heat exchanger and the absorber tower;

returning spent absorber fluid from the heat exchanger to the absorber fluid source while always bypassing the absorber tower; and recovering and returning absorber fluid from the absorber tower to the absorber fluid source while always bypassing the heat exchanger.

* * * * *